Patented Nov. 10, 1942

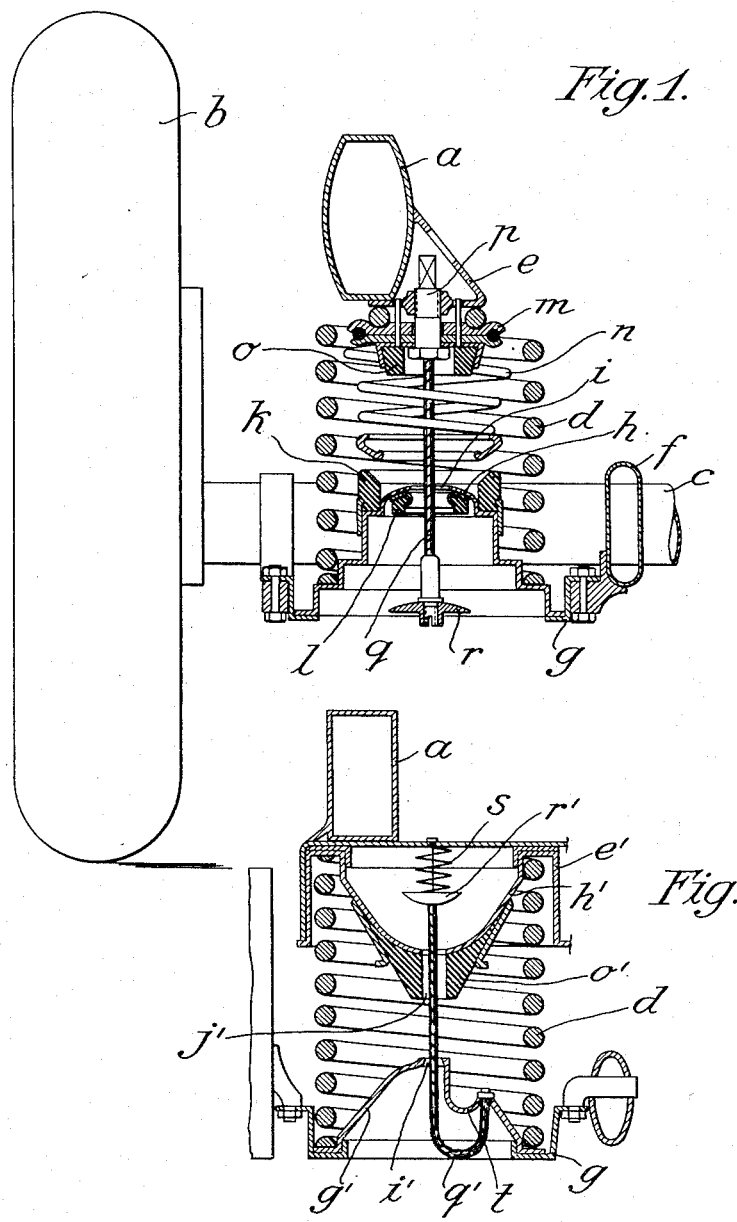

2,301,742

UNITED STATES PATENT OFFICE 2,301,742

SPRING SUSPENSION

Josef Müller, Stuttgart, Germany; vested in the Alien Property Custodian

Application October 14, 1939, Serial No. 299,422
In Germany October 11, 1938

4 Claims. (Cl. 267—60)

The present invention relates to devices for limiting the lift of vehicle axles, spring suspended by means of unguided spiral or helically wound springs having limiting abutments located inside of said springs. The invention may be carried out substantially in this way, that within a spiral spring there is provided an apertured abutment plate connected to one of the spring seat members and forming a limiting abutment for both directions of spring movement. In order to form cooperating abutments I provide on one side of the other spring seat member an abutting member secured directly thereto, and on the other side thereof a second abutting member arranged on the opposite side of the apertured abutment plate. Said second abutting or stop member has a floating connection to the last named spring seat member by means of a rod, a suitably arranged cable or the like threaded through the abutment plate. At least one of the cooperating abutments is formed as a resilient member, especially as a rubber buffer. Furthermore the abutment plate arranged inside the spiral or helically wound spring may also act as a spring seat member or as an abutting member for an auxiliary spiral spring arranged within the main one.

The invention achieves in an exceedingly simple manner, the object of obtaining a limitation of the lift of a spring suspension in both directions without involving the necessity of additional space. The invention may be advantageously applied in and for motor driven vehicles.

The invention will be further particularly described with reference to the accompanying drawing in which: Fig. 1 and Fig. 2 represent respectively, in sectional elevation, two exemplary embodiments of this my invention.

Referring by characters to the drawing, $a$ indicates in Fig. 1 a vehicle frame reposing on an axle $c$. The spring movements between the axle and the frame are absorbed by a helically wound or spiral spring $d$ bearing by one of its ends on a spring seat member $e$ connected to the frame and by its other end on a spring seat member $g$ connected respectively to an axle $c$ and to a thrust stay $f$. The lowermost spring seat member $g$ is extended upwardly to form a cup-shaped member projecting into the spiral spring, the bottom or top $h$ of said cup-shaped extension being adapted to serve as an abutment plate in the manner described below, said plate being provided with a central opening $i$. A rubber ring $k$ is arranged on the upper side of said abutment plate and a rubber ring $l$ on its bottom side. In order to fix the upper end of the spiral spring $d$ on the spring seat member $e$ a two-part clamp $m$ is provided holding firmly between its both parts a freely depending auxiliary spiral or helically wound spring $n$. Furthermore a rubber ring $o$ is provided on the clamp which is fixed jointly with the said rubber ring on the spring seat member $e$ by means of a bolt $p$.

Said bolt $p$ has further connected means such as a cable $q$ led downwardly through an opening $i$ of the abutment plate $h$ and having provided on its bottom end a stop member $r$.

The operation of the device is as follows:

When the frame $a$ is moving downward in relation to the axle $c$ with a simultaneous compression of the spiral spring $d$, it occurs first of all that after a certain initial movement, the end of the auxiliary spiral spring $n$ is applied onto the rubber ring. Thereby the total spring stiffness for the further compression movement is increased. The downward movement of the frame is limited by the rubber ring $o$ being applied onto the abutment plate $h$.

A motion of the spring in the opposite direction, relieving the compression of spring $d$, for example when a depression in the ground is being passed over, is limited by reason of the fact that the stop member $r$ carried by the cable $q$ is applied on the bottom of the rubber ring $l$ provided on the abutment plate $h$.

The embodiment exemplified on Fig. 2 wherein corresponding parts bear like reference marks as those of Fig. 1 differs from that latter substantially therein that it has no particular auxiliary spring and also therein that the bilaterally acting abutment plate is not associated to the bottom spring seat member, but to the top one. In this connection the top spring seat member $e'$ is vaulted in downward direction to project into the spiral spring, the central portion of the vault acting as abutment plate $h'$ and being provided with a rubber buffer $o'$. The bottom spring seat member $g$ is arranged somewhat symmetrically to the top member, its vault projecting upwards, and the vaulted portion $g'$ serving as an abutment cooperating with the rubber buffer $o'$. The bottom spring seat member has further connected thereto a cable $q'$ led through the openings $i'$ and $j'$ of the abutting members, the upper end of the cable having connected thereto a stop member $r'$.

The weight of said stop member $r'$ may be compensated by hanging the stop member on a light spring $s$.

When the spring $d$ is compressed, the lift or the spring motion is limited by the abutting member $g'$ applying onto the rubber buffer $o'$, whereas an opposite spring movement (when the spring $d$ is relieved of its stress) is limited by the application of the stop member $r'$ onto the abutment plate $h'$.

For the purpose of guiding and preserving the cable $q$ a particular guiding member $t$ may be arranged on the spring seat member $g$ or respectively on the abutting member $g'$ connected thereto.

The invention may be used, instead of with unguided spiral springs, also in connection with other well-known unguided compressible springs similarly arranged.

The word "frame" as used throughout the description and claims, is not to be understood as limited to such a device formed separate from the body or coachwork of the vehicle, but as including such devices when formed integrally with said body or coachwork, as is well-known in this art.

Accordingly, the invention is not intended to be limited to the forms shown, which are to be understood as illustrative only and not as limiting, as various changes in construction and arrangement may be made, all coming within the scope of the claims which follow.

What I claim is:

1. In a vehicle, a sprung frame member and an unsprung wheel-supporting member, cooperating spring seats on each of said members, an unguided helical spring intermediate said spring seats for resiliently supporting said frame member relatively to said wheel-supporting member, resilient abutment means interconnected with one of said spring seats interiorally of said helical spring for limiting the motion of said spring seats toward one another, said resilient abutment means being provided with a substantially central opening, and a cable attached at one end with the other of said spring seats, passing and movable through said opening, and having a stop upon its other end for limiting its motion through the opening in said resilient abutment means and thereby limiting motion of said spring seats away from one another.

2. In a vehicle having a frame, a wheel-supporting axle, cooperating spring seats on said frame and axle, an unguided helical spring in said seats between said frame and axle, an abutment plate having a central opening connected to one of said spring seats, a resilient abutment connected to the other spring seat, cooperating with one side of said abutment plate to limit the motion of said axle and frame toward one another, a stop member positioned on the other side of said abutment plate, a member extending through the opening in said abutment plate, connecting said stop member to said other spring seat, and a resilient cushion connected to the other side of said abutment plate and cooperating with said stop member to limit the motion of said axle and frame away from one another.

3. The combination according to claim 2, in combination with a resilient abutting member on the one side of said abutment plate, and a second helical spring attached to said other spring seat and cooperating with said resilient abutting member to increase the total springing effect after said frame and axle have moved a predetermined distance toward one another.

4. In and for a motor vehicle, a vehicle frame, an axle carrying a wheel, an unguided compresible spring between the axle and the frame being applied on spring seat members within the compressible spring, an abutment plate connected with one of the spring seat members, said plate having a central opening and serving as limiting abutment for the spiral spring in both directions of spring motion and vaulted towards the centre of the spring, a cooperating abutment being attached to the other spring seat member, on the opposite side of the apertured abutment plate a second abutting member having a floating connection with the last-named spring seat member by means of a member led through the opening and suspended in floating condition within the cavity formed by the vaulted conformation of the abutment plate in such way that in the normal position of the spring suspension it does not project beyond the spring seat member carrying the abutment plate.

JOSEF MÜLLER.